United States Patent [19]

Frischmann et al.

[11] 4,187,757
[45] Feb. 12, 1980

[54] ARRANGEMENT FOR MOUNTING AN OBJECT TO A SUPPORT STRUCTURE

[75] Inventors: Albert Frischmann, Emmendingen; Kurt Mermi, Teningen; Rudolf Königer, Buchholz-Batzenhäusle, all of Fed. Rep. of Germany

[73] Assignee: Upat GmbH & Co, Emmendingen, Fed. Rep. of Germany

[21] Appl. No.: 922,738

[22] Filed: Jul. 25, 1978

[51] Int. Cl.² .............................................. F16B 13/04
[52] U.S. Cl. .......................................... 85/80; 151/37; 151/41.7 S
[58] Field of Search ................. 85/80, 84, 83, 82, 3 R, 85/3 S, 3 K, 72, DIG. 2; 151/41.75, 37

[56] References Cited

U.S. PATENT DOCUMENTS

| | | | |
|---|---|---|---|
| 2,144,895 | 1/1939 | Place | 85/3 S |
| 2,387,468 | 10/1945 | Ritzel | 85/35 X |
| 3,318,183 | 5/1967 | Fischer | 85/84 |
| 3,341,903 | 9/1967 | Buntic | 85/80 X |
| 3,513,746 | 5/1970 | Forsberg | 85/3 R |
| 3,651,734 | 3/1972 | McSherry | 85/80 |
| 3,874,264 | 4/1975 | Polos | 85/80 X |
| 4,082,030 | 4/1978 | Erickson | 85/80 |

FOREIGN PATENT DOCUMENTS

2304051   8/1974   Fed. Rep. of Germany .............. 85/80

*Primary Examiner*—Ramon S. Britts
*Attorney, Agent, or Firm*—Michael J. Striker

[57] ABSTRACT

An arrangement for mounting an object to a support structure having a rear side which is difficult of access, has an anchoring element including a base portion and a plurality of leg portions extending from the base portion, and a mounting element arranged for mounting the object to the support structure and urging the anchoring element to abut against the support structure at the rear side thereof. The leg portions of the anchoring element are substantially rigid in a longitudinal direction which corresponds to a loading direction of the arrangement, and are resiliently yieldable in a transverse direction so that when the anchoring element is inserted into a mounting hole of the support structure the leg portions are urged toward one another in the transverse direction, and when the anchoring element passes rearwardly beyond the rear side of the support structure the leg portions spread apart from one another in the transverse direction. The mounting element extends through an inner passage of the base portion of the anchoring element and is operative for urging the latter so that the leg portions of the anchoring element abut against the support structure at the rear side of the latter.

54 Claims, 8 Drawing Figures

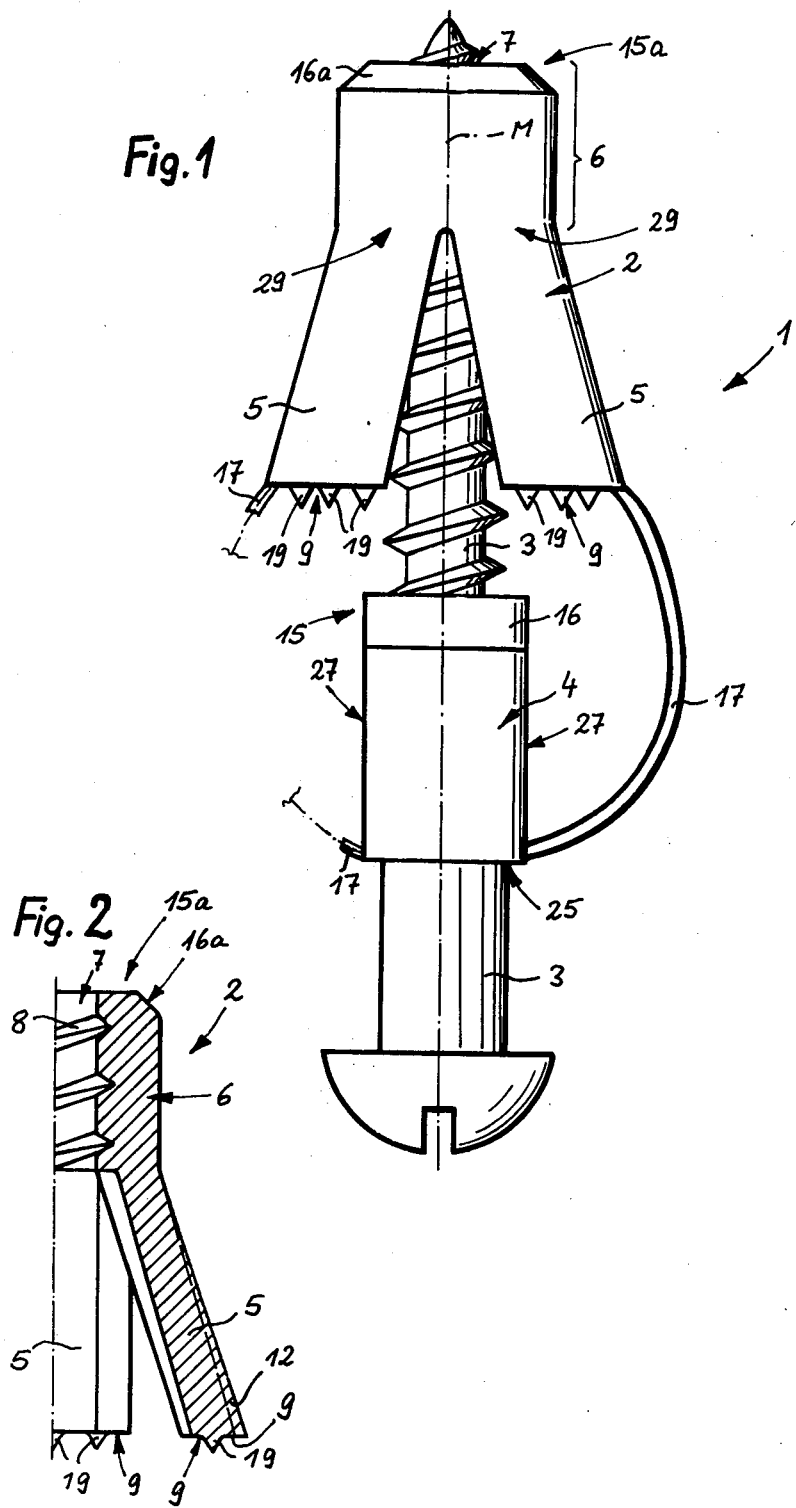

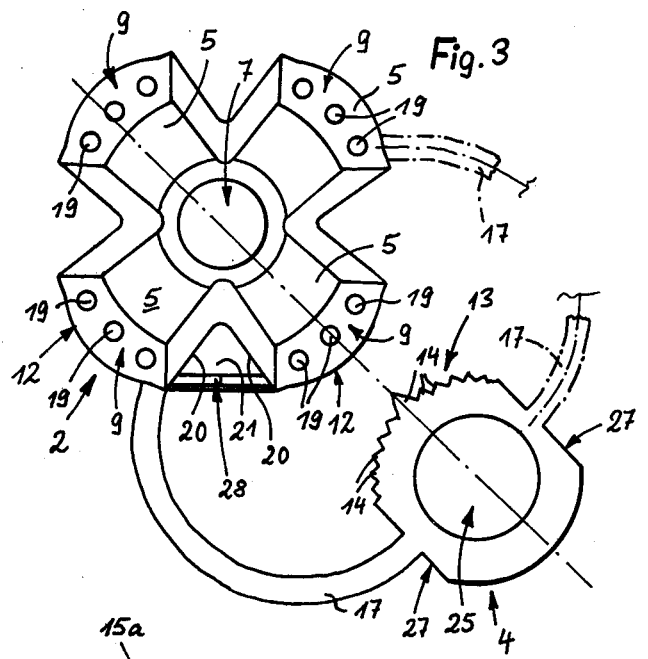
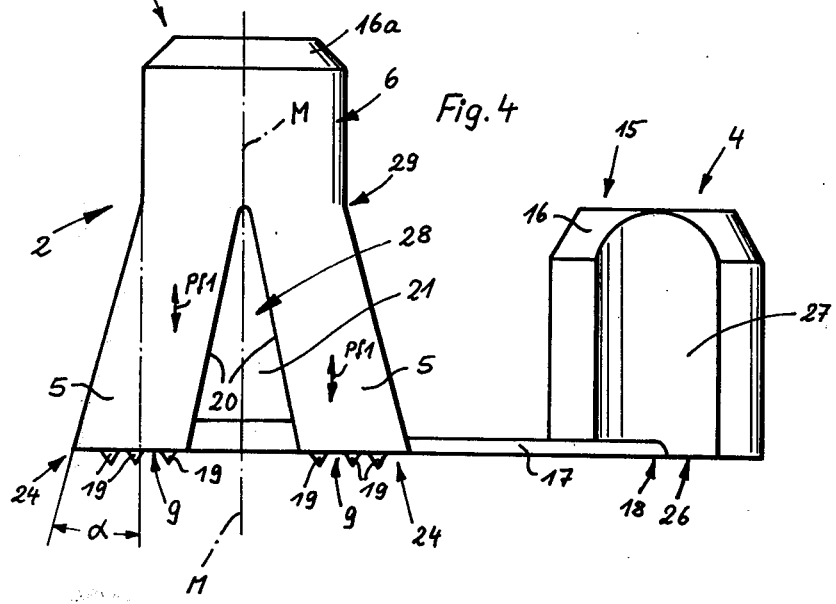

ARRANGEMENT FOR MOUNTING AN OBJECT TO A SUPPORT STRUCTURE

BACKGROUND OF THE INVENTION

The present invention relates to an arrangement for mounting an object to a support structure having a rear side which is difficult of access, such as having hollow cavities at the rear side.

In general, the prior art has encountered very serious difficulties when it is desired to mount an object on a wall or support structure having hollow cavities at the rear side thereof. It has been proposed to utilize a dovel whose anchoring element passes through a mounting hole into a cavity or the like at the rear side of the support structure and is anchored therein by means of tilting or spreading. Such a dovel possesses a disadvantage that it is expensive, requires provision of a relatively big mounting hole, and is frequently complicated and difficult to handle.

A mounting element for mounting an object to a hollow wall or the like has further been proposed, which has an inner thread and several finger-like spreading legs. The latter are radially urged toward one another when the mounting element is inserted into the mounting hole by means of a mounting screw. When the finger-like legs passes into a hollow cavity, they substantially spread apart from one another. Under the pulling action of the mounting screw these spreading legs are gradually brought in contact with the rear side of the wall, for instance with considerable deformation. This results from the fact that the spreading legs approach and abut the rear side of the wall substantially parallel to the latter. Occasionally, these spreading legs can partially or completely penetrate into the wall at the rear side. Such a mounting element is disadvantageous because of uncontrollable behavior of its spreading legs and excessive elasticity of the latter. Furthermore, it must be provided with a long thread whereby a considerable mounting time is required.

A further disadvantage of the abovementioned known mounting element results from the fact that it behaves differently in the support structures or walls which are constituted by soft or hard materials. When the mounting element is used for the support structures which are constituted by soft materials, resistance of the support structure which is required for spreading of the mounting element and particularly hardness and stability of the support structure can be not sufficient so that the spreading legs of the mounting element penetrate into the support structure or wall. In such a case there is a danger that an edge of the mounting hole of the support structure will be damaged. Furthermore, in such a construction practically no definite mounting conditions are attained inasmuch as an optimum mounting position, similar to the construction with substantially flat abutment of the spreading legs, is at least difficult or completely impossible to be distinguished during screwing of the mounting screw.

The fore-mentioned mounting element also possesses a disadvantage that required centering of the same in the mounting hole is impossible, or possible only with the aid of additional means, such as special screws and the like.

SUMMARY OF THE INVENTION

Accordingly, it is an object of the present invention to provide an arrangement for mounting an object to a support structure having a rear side which is difficult of access, (e.g. a drywall) which avoids the disadvantages of the prior art.

More particularly, it is an object of the present invention to provide an arrangement for mounting an object to a support structure having a rear side which is difficult of access, which arrangement is simple to manufacture, permits a comparatively high loading, and can be mounted easily and with small effort.

In keeping with these objects and with others which will become apparent hereinafter, one feature of the present invention resides, briefly stated in an arrangement for mounting an object to a support structure having a rear side which is difficult of access, which arrangement comprises an anchoring element having a base portion and a plurality of legs extending from the base portion, and a mounting element arranged for mounting the object to the support structure and for urging the anchoring element, so that the leg portions of the latter abut against the support structure at the rear side thereof, wherein the leg portions of the anchoring element are substantially rigid in a longitudinal direction corresponding to a loading direction of the arrangement and are resiliently yieldable in a transverse direction so that the leg portions are urged toward one another in the transverse direction when the anchoring element is inserted into a mounting hole of the support structure, and thereafter the leg portions spread apart from one another when the anchoring element passes rearwardly beyond the rear side of the support structure and abut against the latter at the rear side. The mounting element extends through an inner passage provided in the base portion of the anchoring element.

Such a construction possesses considerable advantages as compared with the prior art constructions. When the anchoring element is inserted into the mounting hole of the support structure the leg portions thereof move radially inwardly, and thereupon when the anchoring element passes rearwardly beyond the rear side of the support structure, the leg portions spread apart from one another to a predetermined extent. The leg portions of the anchoring element which are substantially rigid in a loading direction of the arrangement abut by their supporting end faces against the rear side of the support structure in a definite position. During screwing of the mounting screw practically no changes of the longitudinal dimension and deformations of the anchoring element take place. Thereby, required mounting conditions are attained in an advantageous manner by means of quick and small displacement of the mounting screw. The rigid leg portions of the anchoring element guarantee an optimum mounting position during screwing the mounting screw therein.

Another feature of the present invention is that the leg portions of the anchoring element have cross-sections which together form an annular surface in the first position, which annular surface has an outer diameter substantially corresponding to that of the base portion and an inner diameter substantially corresponding to that of a shaft portion of the mounting screw. In such a construction an annular surface which is bounded between the outer diameter of the base portion of the anchoring element and the outer diameter of the shaft portion of the mounting screw is utilized in an optimum manner for supporting end surfaces and cross-sections of the leg portions of the anchoring element so that, on the one hand, reliable abutment and, on the other hand, high rigidity and resistance against buckling are ensured.

A further feature of the present invention is that the leg portions of the anchoring element have a cross-section which is cup-shaped or shaped as a circular segment. Such leg portions are provided with depressions and possess especially high resistance against buckling.

Still a further feature of the present invention is that the arrangement is provided with a centering bush having an inner passage through which the mounting screw extends so as to be centered. The bush has a cross-section which substantially corresponds to that of the base portion of the anchoring element. This ensures that the anchoring element is centered in its position whereby favorable load distribution is attained.

In accordance with still an additional feature of the present invention, the anchoring element and the centering bush are connected with one another preferably by means of at least one filament. In such a construction mounting parts of the arrangement can be inserted first without the mounting screw so that an object has not to be immediately mounted and it must have only such a hole which corresponds to the diameter of the mounting screw. Moreover, the mounting screw may be removed without displacing the anchoring element.

In accordance with yet another feature of the present invention, the filament or several such filaments may be connected with the leg portions of the anchoring element at free ends of the same and with the centering bush at a trailing end thereof. The filaments perform not only the "towing functions" but also prevent rotation during screwing the mounting screw into the anchoring element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a side view of an arrangement for mounting an object to a support structure in accordance with the present invention;

FIG. 2 is a longitudinal section of half of an anchoring element of the arrangement;

FIG. 3 is a view from below of the anchoring element with a centering bush;

FIG. 4 is a side view of the anchoring element with the centering bush;

DESCRIPTION OF THE PREFERRED EMBODIMENTS

Figure 5:
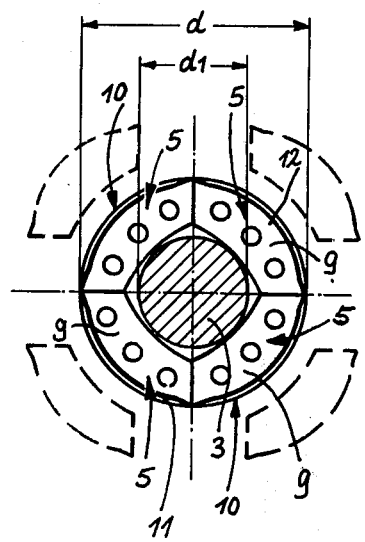
FIG. 5 is a view showing the anchoring element of the arrangement which is inserted into a mounting hole of the support structure.
Figure 6:
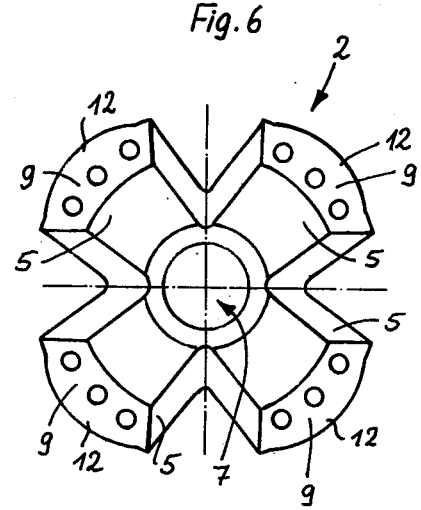
FIG. 6 is a view showing the anchoring element of the arrangement when it is located rearwardly beyond the support structure.

An arrangement for mounting an object to a support structure having a rear side which is difficult of access, is shown in FIG. 1 and identified in toto by reference numeral 1. It has an anchoring element 2 and a mounting element 3 which is to be screwed into the anchoring element 2. In accordance with a preferred embodiment shown in FIG. 1 the arrangement is provided with a centering bush 4.

The anchoring element 2 is substantially stool-like and has a base portion 6 and a plurality of leg portions 5 extending from the base portion. In the shown embodiment four such leg portions 5 are provided. The base portion 6 forms a part which connects the leg portions 5 with one another. The base portion 6 has an inner passage 7 through which the mounting element 3 formed as a screw can extend. For this purpose, the inner passage 7 is provided with a thread 8, particularly with a wood-screw thread, as shown in FIG. 2.

The leg portions 5 extend in a loading direction of the arrangement substantially corresponding to arrow Pf1 in FIG. 4 and are essentially rigid in this direction. On the other hand, the leg portions 5 of the anchoring element 2 are resiliently yieldable in a direction which is transverse to the above-mentioned loading direction of the arrangement. This is needed for insertion of the anchoring element into a mounting hole of the support structure, as will be explained hereinbelow.

The leg portions 5 of the anchoring element 2 include a spreading angle $\alpha$ with a longitudinal axis M which is equal to substantially between 15° and 20°, preferably to substantially 17°. It has been shown in practice that the thus selected angle insures that, on the one hand, the leg portions 5 are moved easily toward one another during inserting of the anchoring member into the mounting hole and, on the other hand, when the leg portions 5 spread apart from one another at the rear side of the support structure their supporting end surfaces 9 are sufficiently spaced from an edge 10 of the mounting hole 11, as shown by dotted lines in FIG. 5.

Since the carrying capacity or the crushing strength of the hollow supporting structure are frequently very small, good distribution of load over a great surface is important. On the other hand, the mounting hole 11 for inserting the anchoring element 2 must be as small as possible. In order to satisfy both above-mentioned requirements, the leg portions 5 have such cross-sections that in a position shown in FIG. 5 wherein they are inserted in the mounting hole, they together form an annular surface whose outer diameter substantially corresponds to the outer diameter of the base portion 6 of the anchoring element 2 and whose inner diameter substantially corrsponds to the diameter of a shaft of the mounting screw 3. The ratio of the diameter of the mounting screw 3 to the diameter of the mounting hole substantially corresponds to the equation $d1:d = 1:2$, wherein $d1$ is a diameter of the mounting screw 3 and $d$ is a diameter of the mounting hole 11.

In order to insure flat abutment of the leg portions 5 against the rear side of the support structure, the supporting end surfaces 9 of the leg portions 5 in an operational position shown, for example, in FIG. 1 extend substantially normal to the longitudinal axis M of the anchoring element 2. Furthermore, as can be seen from FIGS. 4 and 3, an outer surfaces of the leg portions 5 in the operational position substantially corresponds to the outer surface of a truncated cone and have convex sections 12 extending toward a free end 24 of each of the leg portions 5. The convex sections 12 form radially outer extensions of the cross-sections of the leg portions 5. When the leg portions 5 are located in a position shown in FIG. 5 that is when they are inserted in the mounting hole 11, the supporting end surfaces 9 of the leg portions 5 with the extensions formed by the convex sections 12 together have an outer contour which substantially corresponds to the outer diameter of the base portion 6 of the anchoring element 2. Thus, the supporting end surfaces 9 of the leg portions 5 correspond to the cross-section of the mounting hole 11 as close as possible. Moreover, the convex sections 12 additionally reinforce the leg portions 5. The leg portions 5 have the cross-section which is cup-shaped or formed as a circular segment so that the rigidity of the leg portions is further improved.

The centering bush 4 of the mounting arrangement has a cross-section substantially corresponding to that of the base portion 6 of the anchoring element 2 and is provided with an inner passage 25 for the mounting screw 3, as shown in FIG. 1. The bush 4 insures centering of the anchoring element 2, and the distances between the individual leg portions 5 and the edge 10 of the mounting hole are substantially equal, as shown in FIG. 5. The bush 4 also inwardly supports the walls surrounding the mounting hole 11 so as to prevent cracking of the same.

As shown in FIG. 3, the bush 4 may have substantially annular cross-section. It is provided with means 13 for preventing rotation of the same during inserting the mounting screw 3. This means is formed as profiled projections 14 arranged on an outer surface of the bush. A bevel 16 is formed at a trailing end 15 of the bush 4 so as to facilitate insertion of the bush into the mounting hole 11. A similar bevel 16a may also be provided at a leading end 15a of the anchoring element 2, as shown in FIG. 4.

The anchoring element 2 may be connected with the centering bush 4, preferably by means of one or several elements 17, as shown in FIGS. 1, 3, 4, and 8. This connection forms helping means for preliminarily positioning the anchoring element 2 and inserting the same into the mounting hole of the support structure without the mounting element 3. Moreover, the mounting element 3 can be removed, when needed, without withdrawing the anchoring element 2 from the mounting hole 11.

The filaments 17 may be so preformed as to define the original position of the anchoring element 2 relative to the centering bush 4. In this case manufacturing or mounting considerations can be taken into account. The filaments 17 can be curved in a plane corresponding to that of the supporting end surfaces 9 of the leg portions 5 and in a plane corresponding to that of a trailing end surface 26 of the bush 4 so as to laterally engage these surfaces. The connection by means of several filaments 17 shown in FIGS. 1 and 3 is preferable in this case. The filaments may be so formed that in a pre-mounting position the bush 4 and the anchoring element 2 are substantially in axial alignment with one another which can be attained by two or three such filaments.

In the arrangement in accordance with the shown embodiment, the filaments 17 are connected with the leg portions 5 at their free ends and, preferably, are connected with the bush 4 at a trailing region 18 of the latter. Thereby, the filaments 17 perform not only the above-described functions, but also perform the functions of preventing rotation and holding the anchoring element 2. When the mounting screw 3 is being screwed into the anchoring element 2 in order to begin the mounting process, the anchoring element 2 is held by the filament 17 and secured against rotation together with the mounting screw.

The outer surface of the bush 4 may be provided with one or more flattened sections 27 whose number corresponds to the number of the filaments 17. The flattened sections 27 are oriented in a substantially axial direction. Thereby, the filaments 17 are not subjected to clamping action in the regions wherein they are connected with the bush 4.

Preferably, the filaments 17 are comparatively short and particularly has length which is substantially twice as much as the outer diameter of the anchoring element 2, as shown in FIG. 5. Thereby when the anchoring element 2 is inserted, the bush 4 is completely pulled into the mounting hole 11.

The supporting end surfaces 9 of the leg portions 5 are provided with means for preventing rotation and anchoring the latter, which is formed as mammilary projections 19. This means also improves the resistance of the leg portions 5 against buckling. Additional means is also provided in order to improve the resistance against buckling, which means includes connecting elements 21 engaging adjacent side edges 20 of the leg portions 5. These connecting elements are compressible and may be formed particularly as thin films shown in FIGS. 4 and 3. The connecting elements 21 form means 28 for limiting spreading apart of the leg portions 5 from one another.

The leg portions 5 of the anchoring element 2 have cross-sections which reduce toward a region wherein they are articulated with the base portion 6. It is important that the above-mentioned reduction of the cross-section of the leg portions 5 is provided at inner sides of the leg portions, as shown in FIG. 2. In such a construction, the leg portions 5 has different radial resiliency, that is they are easily displaceable inwardly and, at the same time, have high resistance against spreading apart outwardly.

The anchoring element 2, the bush 4, and the filaments 17 preferably are constituted by a synthetic plastic material and are of one-piece with one another so as to form an integral member. In this case, the arrangement in accordance with the present invention is simple to manufacture. Since the above-mentioned elements are manufactured as an integral member forming a prefabricated mounting unit, the arrangement is easy to handle.

Figure 7:
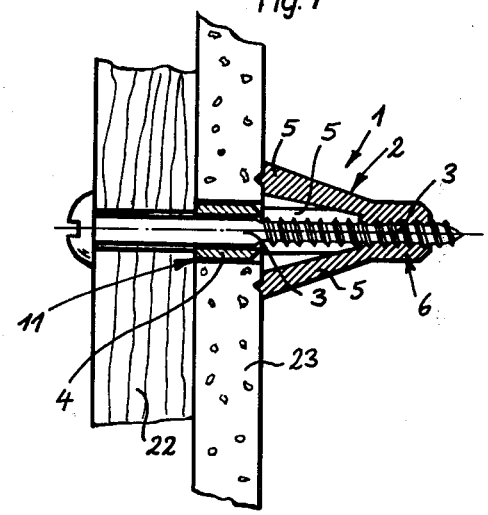
FIG. 7 is a view showing a longitudinal section of the arrangement, the support structure, and an object mounted to the support structure by means of the arrangement.

FIG. 7 illustrates the arrangement in accordance with the present invention in its mounting position. A plate 22 is mounted to a hollow supporting structure 23 by means of the mounting screw 3. The centering bush 4 is located in the mounting hole 11 and determines the axial position of the anchoring element 2. The axial length of the bush 4 substantially corresponds to the wall thickness of the support structure 23. The bush 4 performs its functions even when it has a small length. The axial length of the bush 4 preferably corresponds to the thickness of gypsum plates on the market, and equal to substantially 9 mm.

The anchoring element 2 of the arrangement may be constituted by metal, in which case it must be elastic at least in the region wherein the leg portions 5 are connected with the base portion 6. However, in accordance with the advantageous embodiment of the invention it is constituted by an elastic synthetic plastic material. In addition to known characteristics of a synthetic plastic material, such as simplicity to manufacture and inherent elasticity, the leg portions 5 constituted by a synthetic plastic material have an advantage that the supporting end surfaces 9 of the leg portions 5 may be so large and flat that the support structure which is often constituted by a material having low load resistance is not subjected to high surface pressure. This is especially important for the region of the edges of the mounting hole.

An important advantage of the arrangement in accordance with the present invention is that the thickness of the support structure is of no importance. Both thin and very thick walls or intermediate partitions of the support structure can be overlapped by the correspondingly dimensioned mounting screw, and no correspondence thereof to other parts of the arrangement is needed. As for the thickness of the walls or intermediate partitions, they can be utilized substantially universally.

The mounting arrangement which is constructed in accordance with the present invention has a further advantage that the anchoring element 2 and particularly its leg portions 5 have high resistance against buckling and bending over the entire length thereof, with the exeption of desirable elasticity of the leg portions 5 in the region wherein they are connected to the base portion 6. Thereby, the arrangement is a kind of a stop female element which, on the one hand, can be inserted through the mounting hole of the support structure and, on the other hand, abuts against the support structure at the rear side thereof by means of the leg portions. This is because of the predetermined and fixed thickness, for instance, the axial length of the anchoring element. Such a concrete predetermined thickness insures clear and somple mounting conditions. An advantangeous feature of the arrangement in accordance with the invention is the ratio between the diameter d of the mounting hole or of the anchoring element 2 to the diameter d1 of the shaft of the mounting screw 3. The resistance to buckling of the arrangement further contributes to the afore-mentioned advantages, and this is further attained by the fact that the free cross-section of the mounting hole 11 is utilized to the greatest possible extent, as can be seen particularly from FIG. 5.

Figure 8:
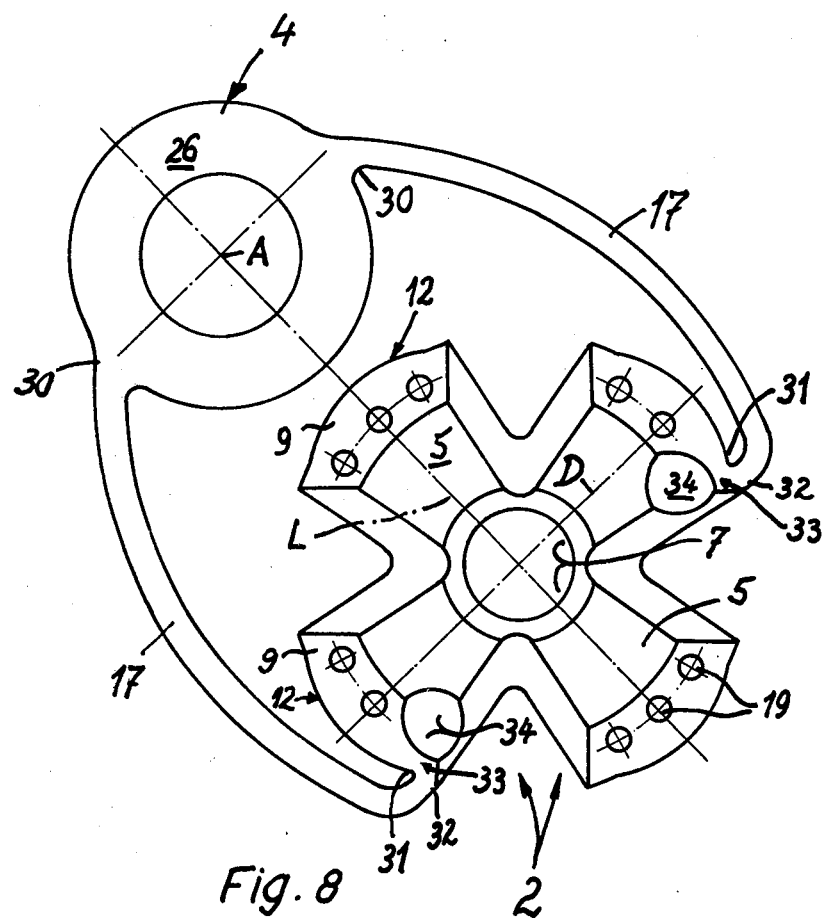
FIG. 8 is a view substantially corresponding to that shown in FIG. 3, but in accordance with another embodiment of the present invention.

FIG. 8 shows the mounting arrangement in accordance with another embodiment of the present invention wherein the arrangement including the anchoring element 2 and the centering bush 4 is shown in manufactured conditions when the above-mentioned parts are removed from a mold and ready to use. The anchoring element 2 is located substantially parallel to the bush 4. Surfaces 9 and 26 of the anchoring element 2 and the bush 4, respectively, which are outer surfaces, as considered in the direction of insertion of the mounting screw 3, are in alignment with one another. The connecting filaments 17 extend in a plane substantially corresponding to the above-mentioned surfaces 9 and 26. The mold in this case may have especially advantageous location of a plane of mold joint.

An axis A of the manufactured bush 4 lies on a center line L extending between two oppositely located leg portions 5, or on an extension of this center line. The filaments 17 engage two other oppositely located leg portions 5 of the anchoring element 2. Points 30 wherein the filaments 17 are connected with the bush 4 are located diametrically opposite to one another and at a diameter which is substantially parallel to a diametric line D extending through the leg portions which are engaged by the opposite ends of the filaments 17. This can be seen from FIG. 8 and is also true for the arrangement shown in FIG. 3.

In contrast to the arrangement in accordance with the embodiment shown in FIG. 3, the arrangement shown in FIG. 8 has an advantageous construction wherein the filaments 17 are connected with ends 41 of the supporting end faces 9 of the leg portions 5, which ends 31 face away from the bush 4. This results in that the filaments 17 have substantially greater length and are subjected to small deformation and bending when they are deformed from the coaxial position of the bush 4 and the anchoring element 2. Correspondingly, elastic force is also smaller whereby the process of mounting of the arrangement becomes easier.

In order to further reduce bending stresses, connecting regions 32 of the filaments 17 and/or corresponding connecting regions 33 of the leg portions 5 of the anchoring element 2 are elastic. One possible embodiment of such a construction is shown in FIG. 8. The leg portion 5 has a reduced cross-section in the connecting region 33 of the supporting surface 9, which is adjacent to the connecting region 32 of the filement 17. This reduction is formed as a recess 34 provided at an inner side of the leg portion 5 which faces away from the filament 17, that is in the region of an inner corner of the leg portion 5. The recess 34 may have different shapes.

When the arrangement is in its original or manufacturing condition, the leg portions 5 extend in a substantially radial direction, whereas the filaments 17 in the connectiong regions also extend in the radial direction. When thereupon the bush 4 or the anchoring element 2 is displaced relative to one another so as to assume their coaxial positions, the filaments 17 are twisted to a certain extent in dependence upon the cross-section of the filaments. The filaments 17 may have, for instance, a flat cross-section as shown in FIG. 4.

The mounting arrangement which is formed as an integral member is easy to manufacture as a result of combination of individual or several features. This is especially true for the afore-mentioned arrangement shown in FIG. 8 wherein easy bending of the filaments 17 for positioning the bush 4 coaxially with the anchoring element 2 is possible. The filaments 17 are deformed in a S-like manner. In this case, the filaments 17 has a greater radius of curvature as compared with that of the filaments shown in FIG. 3, or permits reduction of eccentricity of the centering bush 4 relative to the anchoring element 2 in the original position. The advantage of additional resistance against rotation insured by the filaments 17 is retained in this case.

It will be understood that each of the elements described above, or two or more together, may also find a useful application in other types of constructions differing from the types described above.

While the invention has been illustrated and described as embodied in an arrangement for mounting an object to a support structure having a rear side which is difficult of access, it is not intended to be limited to the details shown, since various modifications and structural changes may be made without departing in any way from the spirit of the present invention.

Without further analysis the foregoing will so fully reveal the gist of the present invention, that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for mounting an object to a support structure having a rear side which is difficult of access, the arrangement comprising an anchoring element having a base portion provided with an inner passage, and a plurality of leg portions extending from said base portion in a first direction which substantially corresponds to a loading direction of the arrangement, said leg portions being substantially rigid in said first direction and resiliently yieldable in a second direction which is substantially transverse to said first direction so that when said anchoring element moves to a first position in which it is inserted into a mounting hole of the support structure said leg portions are urged toward one another in said second direction, and when said anchoring element passes rearwardly beyond the rear side said leg portions spread apart from one another in said second direction; a centering bush arranged to be inserted into the mounting hole of the support structure after said anchoring element passes through the mounting hole, and having a further passage, said centering bush being connected with said anchoring element; connecting means including at least one flexible connecting member which extends between said anchoring element and said centering bush and connects them with one another; and a mounting element arranged for mounting the object to the support structure, said mounting element extending through said further passage of said centering bush and said inner passage of said base portion of said anchoring element and being operative for urging the latter in said first direction so that said leg portions of said anchoring element abut against the support structure at the rear side thereof, said anchoring member, said centering bush, and said connecting member being constituted by a synthetic plastic material and being of one piece with each other so as to form a one-piece unit whose anchoring element, including its base portion and leg portions, and centering bush all extend in said first direction when said anchoring element passes rearwardly beyond the rear side of the support structure, said centering bush is inserted in the mounting hole of the support structure, and said mounting element extends through said centering bush and said anchoring element.

2. An arrangement as defined in claim 1, wherein said mounting element is a mounting screw.

3. An arrangement as defined in claim 2, wherein said leg portions of said anchoring element have cross-sections which together form a substantially circumferentially closed annular surface in said first position.

4. An arrangement as defined in claim 3, wherein said base portion has a predetermined outer diameter, said annular surface formed by the cross sections of said leg portions in said first position having an outer diameter which substantially corresponds to said outer diameter of said base portion.

5. An arrangement as defined in claim 3, wherein said mounting screw has a shaft portion having a predetermined diameter, said annular surface formed by the cross sections of said leg portions in said first position having an inner diameter which substantially corresponds to said diameter of said shaft portion of said mounting screw.

6. An arrangement as defined in claim 3, wherein said cross-sections of said leg portions extend over substantially the entire length of the latter.

7. An arrangement as defined in claim 1, wherein said anchoring element has a longitudinal axis extending in said first direction, said legs in said second position including with said longitudinal axis an angle which is equal to substantially between 15° and 20°.

8. An arrangement as defined in claim 7, wherein said angle is equal to substantially 17°.

9. An arrangement as defined in claim 2, wherein said inner passage is provided with a thread.

10. An arrangement as defined in claim 9, wherein said thread is a wood-screw thread.

11. An arrangement as defined in claim 1, wherein said base portion of said anchoring element has a predetermined cross-section, said bush having a cross section which substantially corresponds to said cross section of said base portion.

12. An arrangement as defined in claim 1, wherein said connecting member is a filament.

13. An arrangement as defined in claim 12, wherein said leg portions of said anchoring element have free ends spaced from said base portion, said filament being connected to said anchoring element at the free end of one of said leg portions.

14. An arrangement as defined in claim 12, wherein said bush has a leading end and a trailing end as considered in a direction of insertion of the arrangement into the mounting hole of the support structure, said filament being connected to said bush at said trailing end of the latter.

15. An arrangement as defined in claim 12, wherein said bush has a substantially round cross section.

16. An arrangement as defined in claim 15, wherein said bush has an axis and said cross section has an outer recess extending in an axial direction, said filament being connected to said bush in the region of said recess.

17. An arrangement as defined in claim 16, wherein said bush has an outer surface, said recess forming a flat section on said outer surface of said bush, said filament member being connected to said flat section of said other surface.

18. An arrangement as defined in claim 12, wherein said anchoring element has a predetermined outer diameter in said first position, said filament having a length which is substantially twice as much as the outer diameter of said anchoring element in said first position.

19. An arrangement as defined in claim 1, wherein said bush is provided with means for arresting the same against rotation.

20. An arrangement as defined in claim 19, wherein said bush has an outer surface, said arresting means being formed as profiled formations provided on said outer surface of said bush.

21. An arrangement as defined in claim 1, wherein said anchoring element has a leading end and a trailing end and is provided with insertion helping means at said leading end.

22. An arrangement as defined in claim 21, wherein said anchoring element has an edge at said leading end, said insertion helping means being formed by a bevel provided on said edge.

23. An arrangement as defined in claim 1, wherein said bush has a leading end and a trailing end and is provided with insertion facilitating means at said leading end.

24. An arrangement as defined in claim 23, wherein said bush has an edge at said leading end, said insertion facilitating means being formed by a bevel provided on said leading edge.

25. An arrangement as defined in claim 1, wherein said leg portions have outer surfaces which together form a surface of a truncated cone in said second position.

26. An arrangement as defined in claim 25, wherein each of said leg portions has a free end and a supporting surface at said free end, each of said leg portions having a predetermined cross-section and being provided with a convex section forming an outer extension of said cross-section, said convex section extending toward said free end and forming an extension of said supporting surface of a respective one of said leg portions.

27. An arrangement as defined in claim 26, wherein said base portion of said anchoring element has a predetermined outer diameter, said supporting surfaces of said leg portions together with said extensions formed by said convex sections together forming an outer contour which has a diameter substantially corresponding to the outer diameter of said base portion.

28. An arrangement as defined in claim 1, wherein said leg portions of said anchoring element has a supporting end surfaces arranged to abut against the support structure at the rear side thereof, said supporting surfaces being roughened.

29. An arrangement as defined in claim 28, wherein said supporting surfaces have a plurality of mammilary projections.

30. An arrangement as defined in claim 2, wherein said anchoring element has a predetermined outer diameter in said first position, said mounting screw has a diameter which is substantially half as much as the outer diameter of said anchoring element in said first position.

31. An arrangement as defined in claim 12, wherein said connecting means includes between two and five such filaments.

32. An arrangement as defined in claim 31, wherein said connecting means includes two such filaments.

33. An arrangement as defined in claim 1, wherein each of said leg portions of said anchoring element is trough-shaped.

34. An arrangement as defined in claim 1, wherein each of said leg portions of said anchoring element is shaped as a circular segment.

35. An arrangement as defined in claim 1, and further comprising means for limiting spreading apart of said leg portions of said anchoring element in said second position.

36. An arrangement as defined in claim 35, wherein said leg portions have edges facing toward one another, said limiting means including compressible connecting elements which are arranged at said edges of said legs and resiliently connect the latter with one another.

37. An arrangement as defined in claim 36, wherein said connecting elements are thin films.

38. An arrangement as defined in claim 1, wherein each of said leg portions of said anchoring element has a region at which it is articulated with said base portion and has a cross section which reduces toward said region.

39. An arrangement as defined in claim 38, wherein said leg portions of said anchoring element have inner sides facing toward one another, the cross section of each of said leg portions being reduced at said inner side thereof.

40. An arrangement as defined in claim 1, wherein said bush has an axis and extends in said second position through the mounting hole of the support structure which has a predetermined thickness, said bush having an axial length substantially corresponding to the thickness of the support structure.

41. An arrangement as defined in claim 40, wherein said bush extends through the mounting hole of the support structure formed as a gypsum plate and has an axial length substantially equal to 9 mm.

42. An arrangement as defined in claim 12, wherein said leg portions have supporting end surfaces arranged to abut against the support structure at the rear side thereof and said bush has a trailing end surface, said filament being curved in a plane corresponding to said supporting end surfaces of said leg portions and in a plane corresponding to said trailing end surface of said bush and laterally outwardly engaging said surfaces.

43. An arrangement as defined in claim 1, wherein said anchoring element has a longitudinal axis extending substantially in said first direction, said leg portions of said anchoring element have supporting end surfaces arranged to abut against the support structure at the rear side thereof and extending substantially normal to said longitudinal axis.

44. An arrangement as defined in claim 1, wherein said leg portions of said anchoring element have high resistance to buckling and bending.

45. An arrangement as defined in claim 1, wherein each of said leg portions of said anchoring element has a region wherein it is articulated with said base portion, said anchoring element having high resistance to buckling and is unchangeable in a longitudinal direction thereof, with the exception of said regions wherein said leg portions are articulated with said base portion.

46. An arrangement as defined in claim 12, wherein said anchoring element and said bush in a manufactured condition are parallel to one another and have trailing end surfaces which are in alignment with one another, said filament extending in a plane substantially corresponding to said trailing end surfaces.

47. An arrangement as defined in claim 46, wherein said anchoring element has an axis and four such leg portions circumferentially spaced from one another and each located opposite to another of said leg portions, said bush having a further axis which is located on a center line extending between two opposite leg portions, said connecting means including two such filaments engaging two other opposite leg portions of said anchoring element.

48. An arrangement as defined in claim 47, wherein said filaments have first end sections by which they engage said two other opposite leg portions at a predetermined diametric line, and second end sections by which they engage said bush at a diametric line which is substantially parallel to said first-mentioned diametric line.

49. An arrangement as defined in claim 48, wherein said leg portions of said anchoring element have supporting end surfaces arranged to abut against the support structure at the rear side thereof, said first end sections of said filaments engaging said supporting end surfaces at ends of the latter which face away from said bush.

50. An arrangement as defined in claim 46, wherein said filament has an end section and is connected with one of said leg portions of said anchoring element by said end section, said section of said filament being elastic.

51. An arrangement as defined in claim 46, wherein said filament is connected to one of said leg portions of said anchoring element, said one leg portion having further end sections to which said filament is connected and which is elastic.

52. An arrangement as defined in claim 50, wherein said one leg portion has a further end section to which said filament is connected and which is elastic.

53. An arrangement as defined in claim 51, wherein said further end section of said one leg portion has a cross section which is reduced as compared with the remainder section of said one leg portion.

54. An arrangement as defined in claim 53, wherein said further end section of said one leg portion has a recess which reduces said cross section of the latter.

* * * * *